(12) United States Patent
Kim et al.

(10) Patent No.: US 8,787,974 B2
(45) Date of Patent: Jul. 22, 2014

(54) WIRELESS COMMUNICATION BASE STATION HAVING DYNAMIC CELL STRUCTURE

(75) Inventors: Jun Sik Kim, Seoul (KR); Kyong Tak Cho, Daejeon (KR); Byung-Han Ryu, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/613,857

(22) Filed: Sep. 13, 2012

(65) Prior Publication Data

US 2013/0150127 A1  Jun. 13, 2013

(30) Foreign Application Priority Data

Dec. 9, 2011  (KR) .................. 10-2011-0132089

(51) Int. Cl.
*H04M 1/00* (2006.01)
(52) U.S. Cl.
USPC ....................................................... 455/561
(58) Field of Classification Search
USPC .......... 370/328, 336, 254, 252; 455/500, 466, 455/561, 439, 522, 425, 552.1; 375/240.07, 375/240.01
See application file for complete search history.

(56) References Cited

U.S. PATENT DOCUMENTS

| | | | | |
|---|---|---|---|---|
| 2009/0190541 | A1* | 7/2009 | Abedi | 370/329 |
| 2009/0310586 | A1* | 12/2009 | Shatti | 370/338 |
| 2011/0243026 | A1* | 10/2011 | Kim et al. | 370/252 |
| 2012/0039308 | A1* | 2/2012 | Kim et al. | 370/336 |

FOREIGN PATENT DOCUMENTS

| | | |
|---|---|---|
| KR | 1020090011585 | 2/2009 |
| KR | 1020100064234 | 6/2010 |
| KR | 1020100078204 | 7/2010 |

* cited by examiner

*Primary Examiner* — Kiet Doan
(74) *Attorney, Agent, or Firm* — Nelson Mullins Riley & Scarborough LLP; Anthony A. Laurentano, Esq.; Lewis Lee, Esq.

(57) ABSTRACT

Disclosed is a wireless communication base station which includes a plurality of radio units configured to transmit and receive a radio signal; and a digital unit connected to the plurality of radio units via cables and configured to operate a communication protocol. The digital unit controls the plurality of radio units according to a communication environment to be switched into a merge state in which the plurality of radio units forms a cell, or an independent state in which the plurality of radio units forms different cells, respectively.

11 Claims, 9 Drawing Sheets

WIRELESS COMMUNICATION BASE STATION HAVING DYNAMIC CELL STRUCTURE

CROSS-REFERENCE TO RELATED APPLICATIONS

A claim for priority under 35 U.S.C. §119 is made to Korean Patent Application No. 10-2011-0132089 filed Dec. 9, 2011, in the Korean Intellectual Property Office, the entire contents of which are hereby incorporated by reference.

BACKGROUND

The inventive concepts described herein relate to wireless communication, and more particularly, relate to a wireless communication base station with a dynamic cell structure.

A wireless mobile network may provide a seamless wireless communication service to a wireless communication terminal having mobility. The wireless mobile network may be formed of a plurality of base stations.

Each base station may operate one cell. A base station may perform wireless communication with a wireless communication terminal placed within a corresponding cell. When a wireless communication terminal moves from one cell (e.g., a source cell) into another cell (e.g., a target cell), a base station of the target cell may establish communication with a wireless communication terminal, and a base station of the source cell may terminate communication with the wireless communication terminal. This operation may be referred to as a handover (HO). The handover may enable the wireless mobile network to provide a seamless wireless communication service to a wireless communication terminal.

Commercialized wireless mobile networks may include GSM (Global System for Mobile communication), CDMA (Code Division Multiple Access), WCDMA (Wideband CDMA), CDMA 2000, WiMAX (World interoperability for Microwave Access), LTE (Long Term Evolution), and the like.

Interference may be generated at the wireless mobile networks. For example, radio waves transmitted and received by base stations of neighboring cells may interact as interference. In another example, a specific base station may be at a closed subscriber group (CSG) mode in which a wireless communication service is provided to certified wireless communication terminals. When an uncertified wireless communication terminal enters a cell of a base station, it may be provided with a wireless communication service from a faraway base station, not the base station having the cell which the uncertified wireless communication terminal enters. At this time, a radio wave transmitted and received by the specific base station may affect wireless transmission and reception between the uncertified wireless communication terminal and the faraway bases station.

SUMMARY

Example embodiments of the inventive concept provide a wireless communication base station comprising a plurality of radio units configured to transmit and receive a radio signal; and a digital unit connected to the plurality of radio units via cables and configured to operate a communication protocol. The digital unit controls the plurality of radio units according to a communication environment to be switched into a merge state in which the plurality of radio units forms a cell, or an independent state in which the plurality of radio units forms different cells, respectively.

In example embodiments, the radio units have different cell coverage, respectively.

In example embodiments, the digital unit calculates a channel quality based on a channel quality indicator indicating a quality of a downlink channel or information associated with a quality of an uplink channel and controls the plurality of radio units according to the calculated channel quality.

In example embodiments, when the plurality of radio units is at the independent state and a channel quality is below a first critical value, the digital unit controls the plurality of radio units to keep the independent state.

In example embodiments, when the plurality of radio units is at the independent state and a spare wireless resource is below a second critical value, the digital unit controls the plurality of radio units to keep the independent state.

In example embodiments, when the plurality of radio units is at the independent state and a spare wireless resource is over a second critical value, the digital unit controls the plurality of radio units to be switched into the merge state.

In example embodiments, when no terminal being serviced exists, the digital unit controls the plurality of radio units to be switched into an idle state.

In example embodiments, when the plurality of radio units is at the merge state and a quality of service is lowered, the digital unit controls the plurality of radio units to be switched into the independent state.

In example embodiments, when the plurality of radio units is at the merge state and a spare wireless resource is over a fourth critical value, the digital unit controls the plurality of radio units to keep the merge state.

In example embodiments, when the plurality of radio units is at the merge state and a spare wireless resource is below a fourth critical value, the digital unit controls the plurality of radio units to be switched into the independent state.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
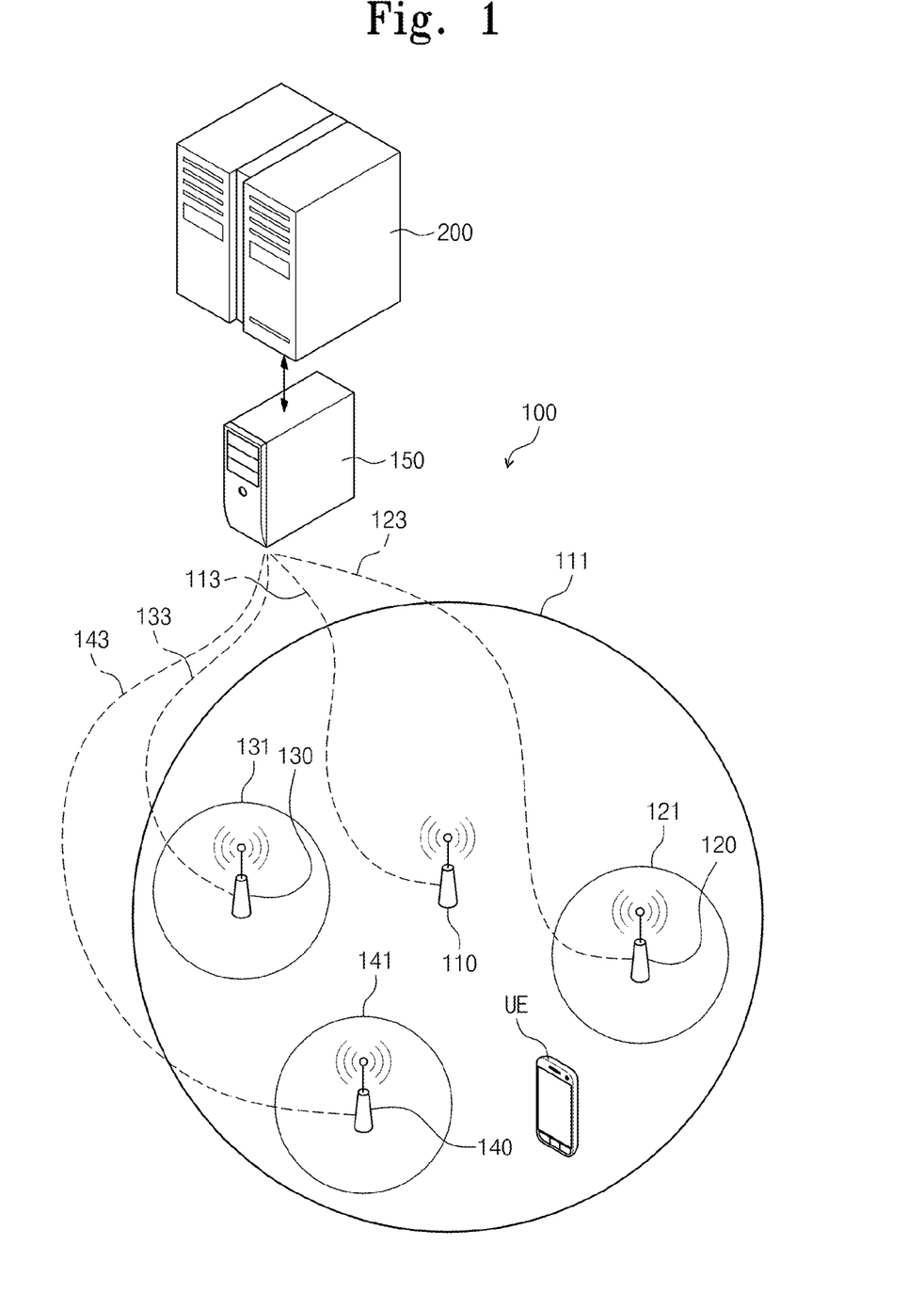
FIG. 1 is a conceptual diagram schematically illustrating a wireless communication base station and an upper server according to an embodiment of the inventive concept.

FIG. 1 is a conceptual diagram schematically illustrating a wireless communication base station and an upper server according to an embodiment of the inventive concept. Referring to FIG. 1, a wireless communication base station 100 may include radio units 110, 120, 130, and 140 and a digital unit 150.

The radio units 110, 120, 130, and 140 may perform wireless transmission and reception with user equipment UE. The radio units 110, 120, 130, and 140 may form cells 111, 121, 131, and 141, respectively. The radio unit 110 may form a cell wider than the radio cells 120, 130, and 140. For example, the cell 111 formed by the radio unit 110 may be a macro cell. The cells 121, 131, and 141 formed by the radio cells 120, 130, and 140 may be pico cells or femto cells. That is, the wireless communication base station 100 may form a heterogeneous network HeNet.

Each of the radio units 110, 120, 130, and 140 may be configured to transmit and receive various bands of radio signals via one radio antenna based on a software defined radio.

The radio units 110, 120, 130, and 140 may be connected to the digital unit 150 through cables 113, 123, 133, and 143, respectively. The cables 113, 123, 133, and 143 may be formed of an optical cable.

The digital unit 150 may process data transmitted and received by the radio units 110, 120, 130, and 140, and may communicate with an upper server 200. The digital unit 150 may operate protocol for communication with the upper server 200.

The digital unit 150 may process a general purpose process (GPP) based baseband signal, and may operate heterogeneous communication protocol of the radio units 110, 120, 130, and 140 using one unified platform.

The upper server 200 may be a mobility management entity (MME) or a gateway. The mobility management entity may control the base station 100 and communication between the base station 100 and the user equipment UE. The mobility management entity may manage more than two base stations. The gateway may relay communication between the base station 100 and the mobility management entity.

The wireless communication base station 100 may have a structure that the radio units 110, 120, 130, and 140 performing wireless transmission and reception and the digital unit 150 operating protocol and communicating with the upper server 200 are distributed. The digital unit 150 of the wireless communication base station 100 may adjust states of the cells 121, 131, and 141 formed by the radio units 110, 120, 130, and 140, according to interference between the radio units 110, 120, 130, and 140 and speech quality.

Figure 2:
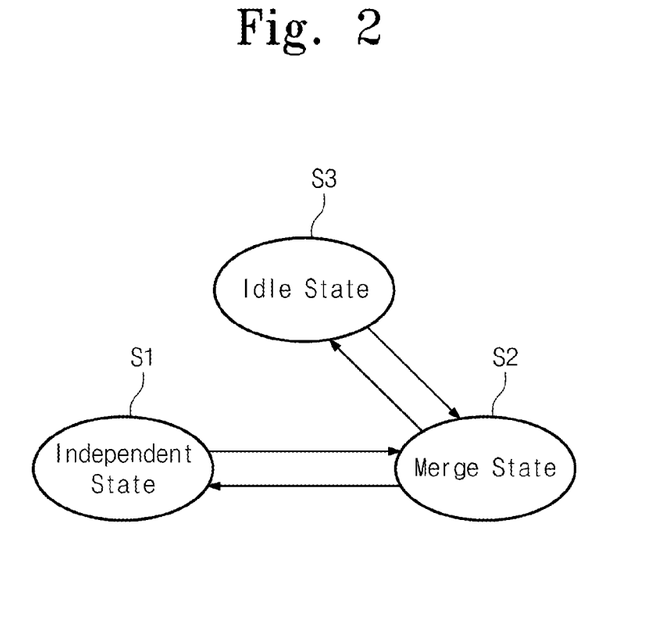
FIG. 2 is a state diagram illustrating states of radio units controlled by a digital unit according to an embodiment of the inventive concept.

FIG. 2 is a state diagram illustrating states of radio units controlled by a digital unit according to an embodiment of the inventive concept. Referring to FIGS. 1 and 2, a digital unit 150 may control radio units 110, 120, 130, and 140 to have one of an independent state S1, a merge state S2, and an idle state S3.

When the radio units 110, 120, 130, and 140 are at the independent state S1, the digital unit 150 may control the radio units 110, 120, 130, and 140 to keep the independent state S1 or to be switched into the merge state S2. When the radio units 110, 120, 130, and 140 are at the merge state S2, the digital unit 150 may control the radio units 110, 120, 130, and 140 to keep the merge state S2 or to be switched into the independent state S1 or the idle state S3. When the radio units 110, 120, 130, and 140 are at the idle state S3, the digital unit 150 may control the radio units 110, 120, 130, and 140 to keep the idle state S3 or to be switched into the merge state S2.

In example embodiments, the digital unit 150 may have a dynamic state or a static state. At the dynamic state, the digital unit 150 may switch states of the radio units 110, 120, 130, and 140 into the independent state S1, the merge state S2, or the idle state S3. At the static state, the digital unit 150 may keep states of the radio units 110, 120, 130, and 140 although a communication environment is changed. For example, the digital unit 150 may control states of the radio units 110, 120, 130, and 140 to keep the independent state S1, the merge state S2, or the idle state S3.

Figure 3:
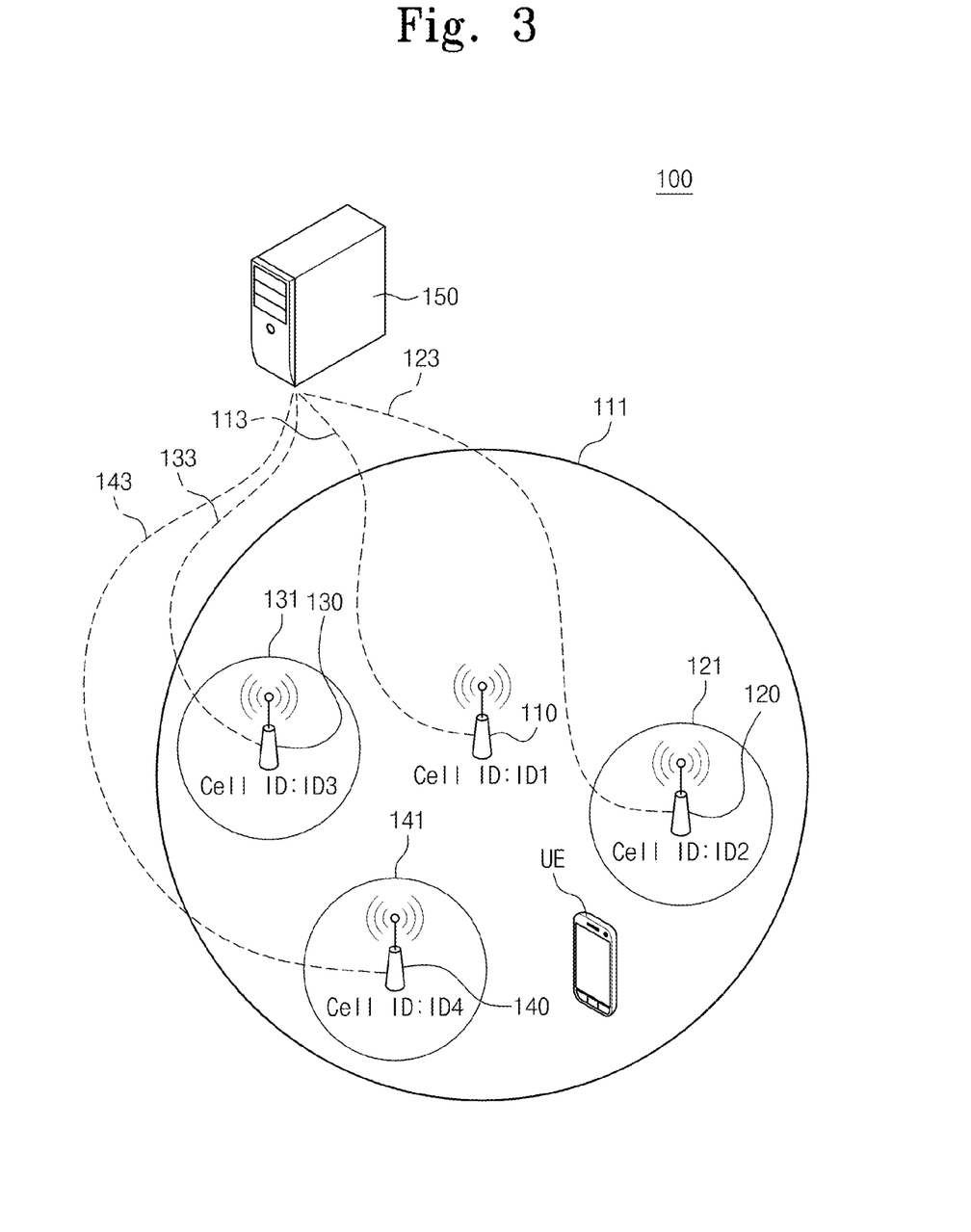
FIG. 3 is a conceptual diagram schematically illustrating a wireless communication base station at an independent state.

FIG. 3 is a conceptual diagram schematically illustrating a wireless communication base station at an independent state. Referring to FIG. 3, a cell identification of a radio cell 110 may be 'ID1', a cell identification of a radio cell 120 may be 'ID2', a cell identification of a radio cell 130 may be 'ID3', and a cell identification of a radio cell 140 may be 'ID4'. That is, the radio units 110, 120, 130, and 140 may have different cell identifications ID1 to ID4, and may form different cells.

At an independent state, a wireless communication base station 100 may form a plurality of cells. When a plurality of cells is formed, a capacity of the wireless communication base station 100 may increase. On the other hand, since the radio units 110, 120, 130, and 140 form different cells 111, 121, 131, and 141, interference may be generated between the cells 111, 121, 131, and 141. The interference may cause lowering of the quality of service QoS provided by the cells 111, 121, 131, and 141.

Figure 4:
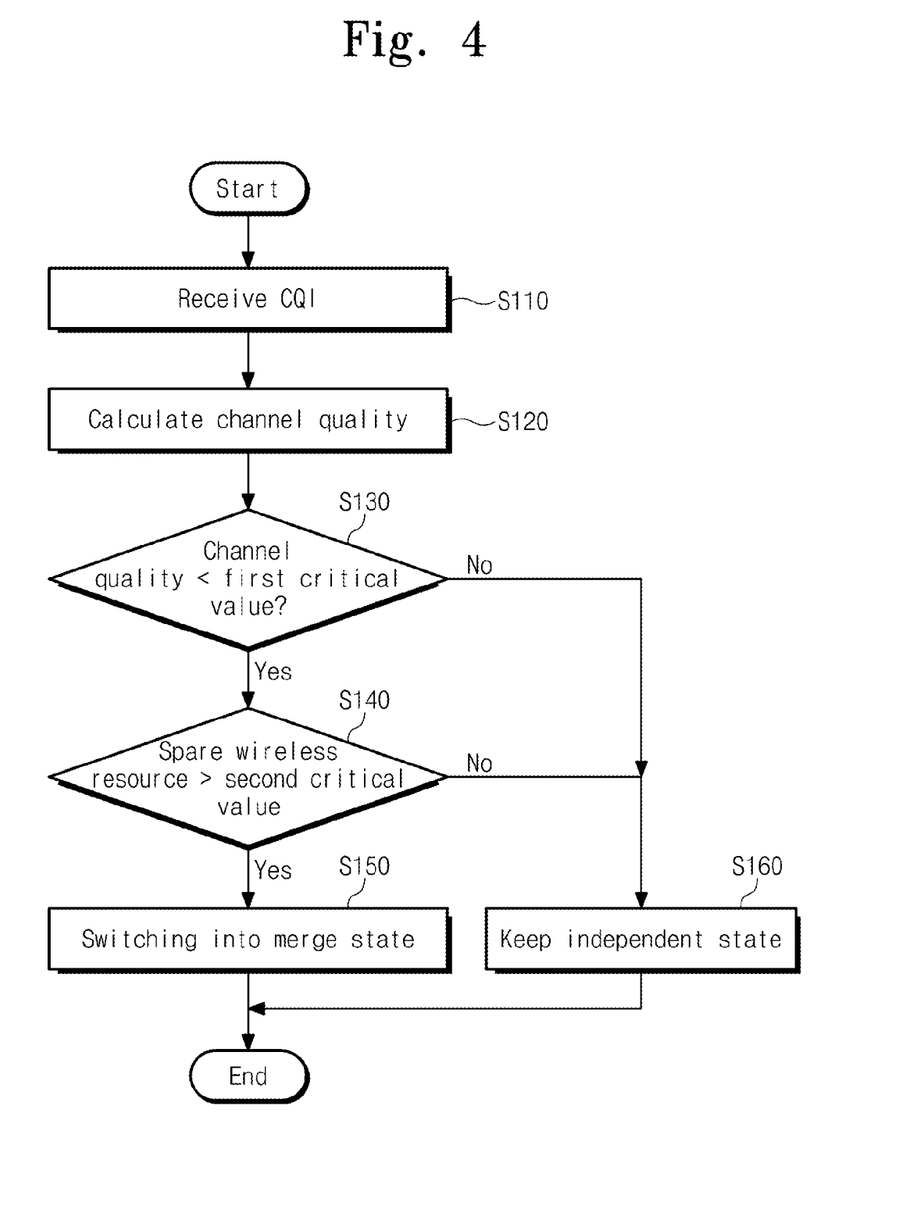
FIG. 4 is a flowchart illustrating an operation of a digital unit when a wireless communication base station is at an independent state.

FIG. 4 is a flowchart illustrating an operation of a digital unit when a wireless communication base station is at an independent state. Referring to FIGS. 3 and 4, in operation S110, a digital unit 150 may receive a channel quality indicator (CQI). The channel quality indicator may indicate the quality of a downlink channel between a wireless communication base station 100 and user equipment UE. One of the radio units 110, 120, 130, and 140 may receive the channel quality indicator from the user equipment UE, and the channel quality indicator may be sent to the digital unit 150.

In operation S120, the digital unit 150 may calculate the channel quality. The digital unit 150 may calculate the channel quality according to the input channel quality indicator. The digital unit 150 may calculate the channel quality based on the reception quality of an uplink channel as well as the channel quality indicator. The digital unit 150 may calculate the wireless quality based on the quality of the uplink or downlink channel or a variation in the quality.

In operation S130, the digital unit 150 may judge whether the channel quality is below a first critical value. The first critical value may indicate the channel quality when no interference is generated at the wireless communication base station 100 or when communication is normally carried out although interference is generated.

When the wireless quality is over the first critical value, the digital unit 150 may control the radio units 110, 120, 130, and 140 to keep an independent state. That is, when the wireless quality is over the first critical value, the digital unit 150 may keep the independent state providing a large capacity. When the wireless quality is below the first critical value, the method proceeds to operation S140.

In operation S140, the digital unit 150 may judge whether a spare wireless resource is over a second critical value. For example, the second critical value may indicate a wireless resource sufficient to normally communicate with the user equipment UE although the radio units 110, 120, 130, and 140 are controlled to a merge state to form one cell. That is, the digital unit 150 may judge whether a spare wireless resource sufficient to normally communicate with the user equipment UE exists although the radio units 110, 120, 130, and 140 are controlled to a merge state.

If the spare wireless resource is below the second critical value, S160, the digital unit 150 may control the radio units 110, 120, 130, and 140 to keep the independent state. If the spare wireless resource is over the second critical value, S150, the digital unit 150 may control the radio units 110, 120, 130, and 140 to be switched into a merge state.

Figure 5:
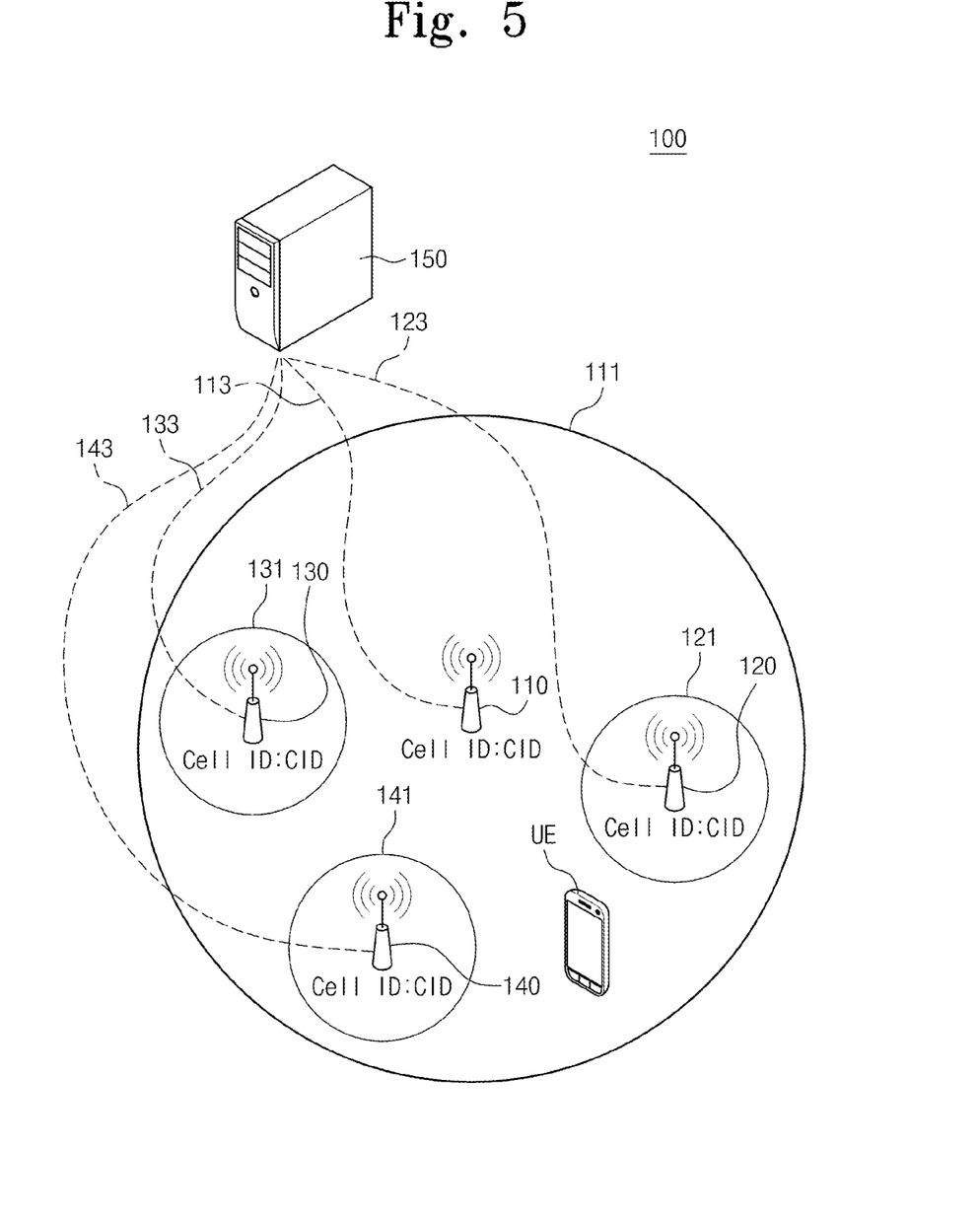
FIG. 5 is a conceptual diagram schematically illustrating a wireless communication base station at a merge state.

FIG. 5 is a conceptual diagram schematically illustrating a wireless communication base station at a merge state. Referring to FIG. 5, radio units 110, 120, 130, and 140 may use a common cell identification CID. That is, the radio units 110, 120, 130, and 140 may form a common cell.

At a merge state, a wireless communication base station 100 may form a common cell. In this case, a capacity of the wireless communication base station 100 may decrease. On the other hand, if the wireless communication base station 100 forms a common cell, no interference may be generated between the radio units 110, 120, 130, and 140. Thus, the quality of service QoS provided by the radio units 110, 120, 130, and 140 may be improved.

Figure 6:
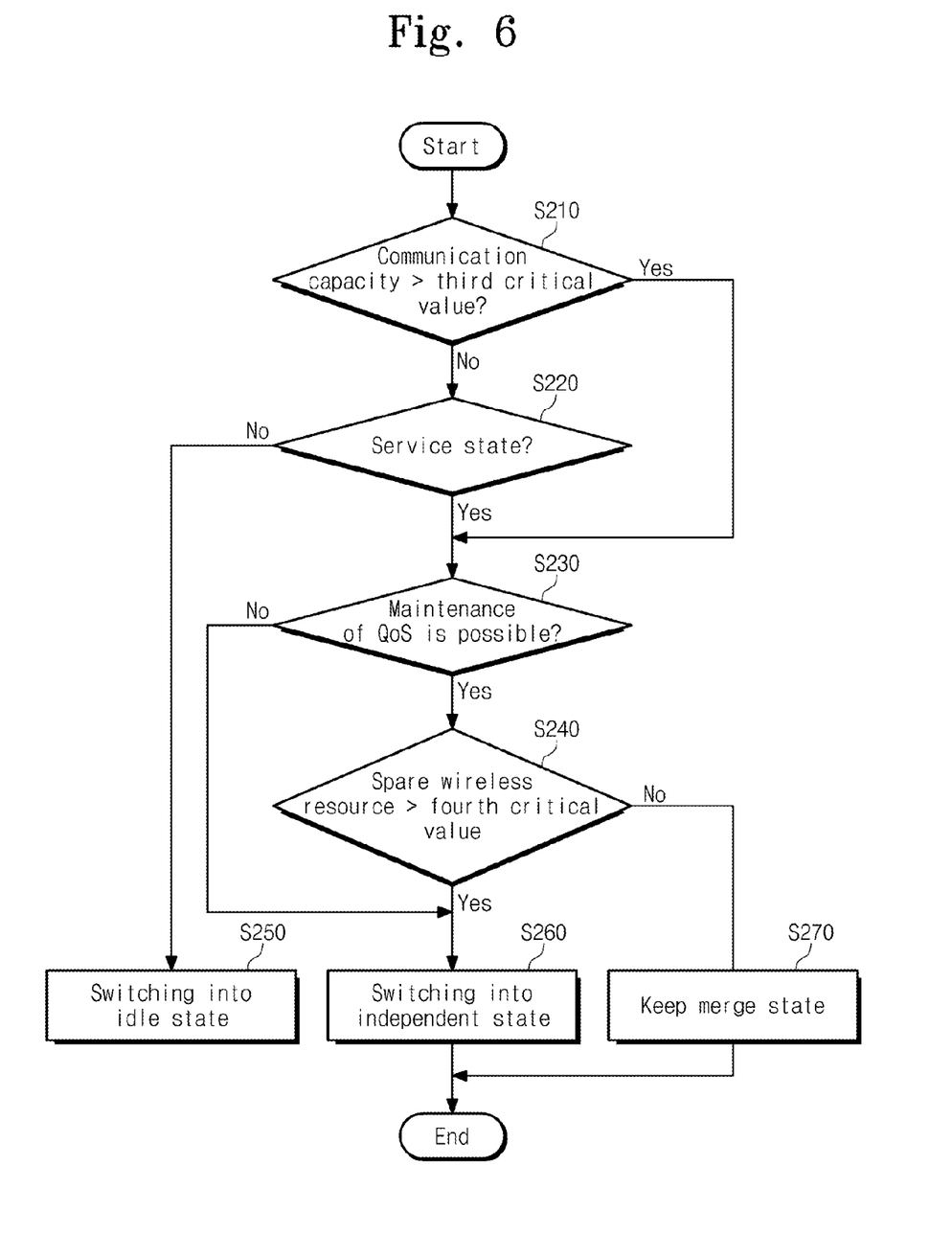
FIG. 6 is a flowchart illustrating an operation of a digital unit when a wireless communication base station is at a merge state.

FIG. 6 is a flowchart illustrating an operation of a digital unit when a wireless communication base station is at a merge state. Referring to FIGS. 5 and 6, in operation S210, a digital unit 150 may judge whether an occupied capacity is over a third critical value. For example, the third critical value may indicate a capacity occupied when the minimum number of user equipment (e.g., at least one) exists within a common cell.

If the occupied capacity is below the third critical value, in operation S220, the digital unit 150 may judge whether a servicing terminal exists. If a servicing terminal does not exist, in operation S250, the digital unit 150 may control radio units 110, 120, 130, and 140 to be switched into an idle state. At the idle state, the radio units 110, 120, 130, and 140 may have a receiving function, and the digital unit 150 may send broadcasting information through the radio units 110, 120, 130, and 140 in a slower period than a typical period. At the idle state, influence of a neighboring base station due to interference of the wireless communication base station 100 may be reduced. If the user equipment UE enters a cell of a wireless communication base station 100 being at the idle state, a state of the wireless communication base station 100 may be switched into a merge state.

When the occupied capacity is over the third critical value (S210) or when a servicing terminal exists (S220), the method proceeds to operation S230. In operation S230, the digital unit 150 may judge whether it is possible to maintain the quality of service. At the merge state, no interference may exist between radio units 110, 120, 130, and 140. Thus, at the merge state, the quality of service may be lowered by an increase in a capacity occupied by the user equipment UE. That is, when the number of user equipment UE communicating the wireless communication base station 100 increases or a capacity occupied by the user equipment increases, the quality of service of the wireless communication base station 100 may be lowered.

When it is difficult to maintain the quality of service, in operation S260, the digital unit 150 may control the radio units 110, 120, 130, and 140 to be switched into an independent state. That is, when the number of user equipment UE communicating the wireless communication base station 100 increases or a capacity occupied by the user equipment increases, the digital unit 150 may control the radio units 110, 120, 130, and 140 to be switched into an independent state, so that a capacity increases.

When it is possible to maintain the quality of service, in operation S240, the digital unit 150 may judge whether a spare wireless resource is below a fourth critical value. The fourth critical value may indicate a spare wireless resource capable of affecting the quality of service due to a decrease in the spare wireless resource. When the spare wireless resource is over the fourth critical value, in operation S270, the digital unit 150 may control the radio units 110, 120, 130, and 140 to keep the merge state.

When the spare wireless resource is below the fourth critical value, in operation S260, the digital unit 150 may control the radio units 110, 120, 130, and 140 to be switched into the independent state. Before states of the radio units 110, 120, 130, and 140 are switched into the independent state, there can be carried out an operation of inducing a handover with respect to the user equipment UE the quality of service of which is to be lowered due to a decrease in the spare wireless resource.

Figure 7:
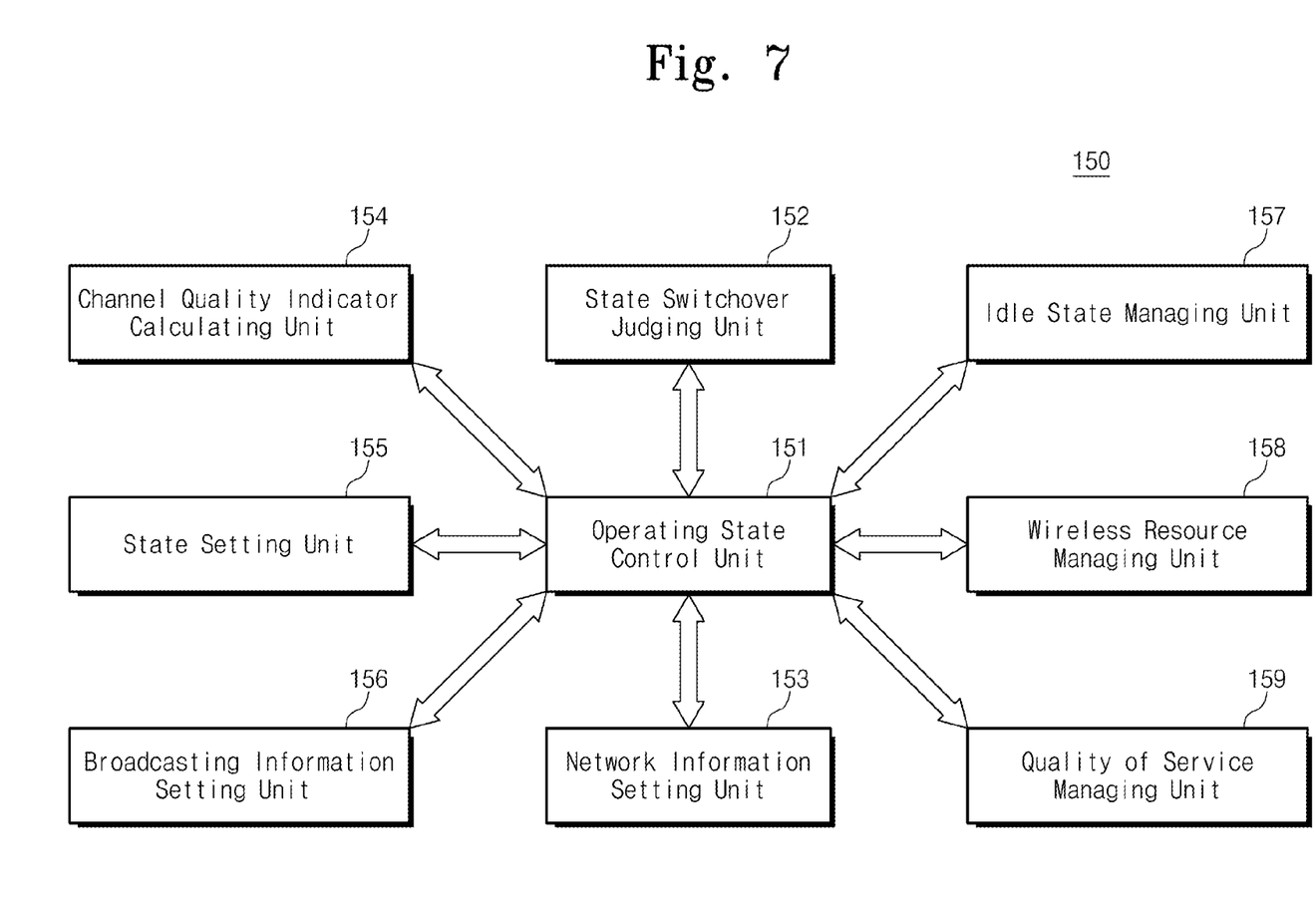
FIG. 7 is a block diagram schematically illustrating a digital unit according to an embodiment of the inventive concept.

FIG. 7 is a block diagram schematically illustrating a digital unit according to an embodiment of the inventive concept. Referring to FIG. 7, a digital unit 150 may include an operating state control unit 151, a state switchover judging unit 152, a network information setting unit 153, a channel quality indicator calculating unit 154, a state setting unit 155, a broadcasting information setting unit 156, an idle state managing unit 157, a wireless resource managing unit 158, and a quality of service managing unit 159.

The operating state control unit 151 may control an overall operation of the digital unit 150. The channel quality indicator calculating unit 154 may calculate an input channel quality indicator to manage a current level and a variation of a channel quality. The state switchover judging unit 152 may judge whether an interference factor is generated at a channel, based on the current level and variation of a channel quality managed by the channel quality indicator calculating unit 154. The state switchover judging unit 152 may compare a channel quality and a first critical value (corresponding to operation S130 in FIG. 4).

The quality of service managing unit 159 may manage the quality of service provided to user equipment UE. The wireless resource managing unit 158 may manage whether it is possible to sufficiently provide the quality of service to the user equipment UE. The wireless resource managing unit 158 may judge whether it is possible to maintain the quality of service (corresponding to operation S230 in FIG. 6).

The state setting unit 155 may set states of radio units 110, 120, 130, and 140 when switchover is required. The network information setting unit 153 may set information indicating that states of radio units 110, 120, 130, and 140 are switched. The broadcasting information setting unit 156 may change broadcasting information output from a wireless communication base station 100, based on information set by the network information setting unit 153. The idle state managing unit 157 may control an output period of broadcasting information when a state of the wireless communication base station 100 is switched into an idle state.

As described above, a wireless communication base station 100 according to an embodiment of the inventive concept may keep an independent state when the channel quality is kept at a high level. When the channel quality is lowered and a spare wireless resource is sufficient, the wireless communication base station 100 may enter a merge state. When no servicing terminal exists, the wireless communication base station 100 may enter an idle state. When the channel quality is lowered or a spare wireless resource is below a predetermined level, the wireless communication base station 100 may enter an independent state. At the independent state, the wireless communication base station 100 may secure a capacity more than that at another state. At the merge state, the wireless communication base station 100 may secure the channel quality higher than that at another state. At the idle, the wireless communication base station 100 may not affect neighboring base stations.

As a state of the wireless communication base station 100 is switched into an independent state, a merge state, or an idle state according to a communication environment, it is possible to optimize the quality of service provided by the wireless communication base station 100 or to minimize interference.

The wireless communication base station 100 is described under the condition that its state is switched into a merge state from an independent state, into an independent or idle state from a merge state, and into a merge state from an idle state. However, referring to FIG. 8 which shows states of radio units controlled by a digital unit according to another embodiment of the inventive concept, when no servicing terminal exists, a state of the wireless communication base station 100 may be switched into an idle state from an independent state.

Figure 8:
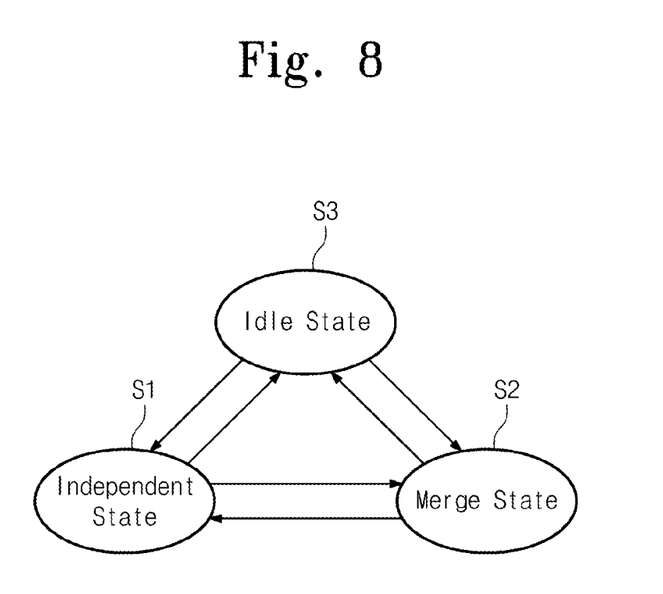
FIG. 8 is a state diagram illustrating states of radio units controlled by a digital unit according to another embodiment of the inventive concept.

In example embodiments, the digital unit 150 may have a dynamic state or a static state. At the dynamic state, as illustrated in FIG. 8, the digital unit 150 may control radio units 110, 120, 130, and 140 to be switched into an independent state, a merge state, or an idle state. At the static state, the digital unit 150 may keep states of the radio units 110, 120, 130, and 140 although a communication environment is changed. For example, the digital unit 150 may control radio units 110, 120, 130, and 140 to keep an independent state, a merge state, or an idle state.

Figure 9:
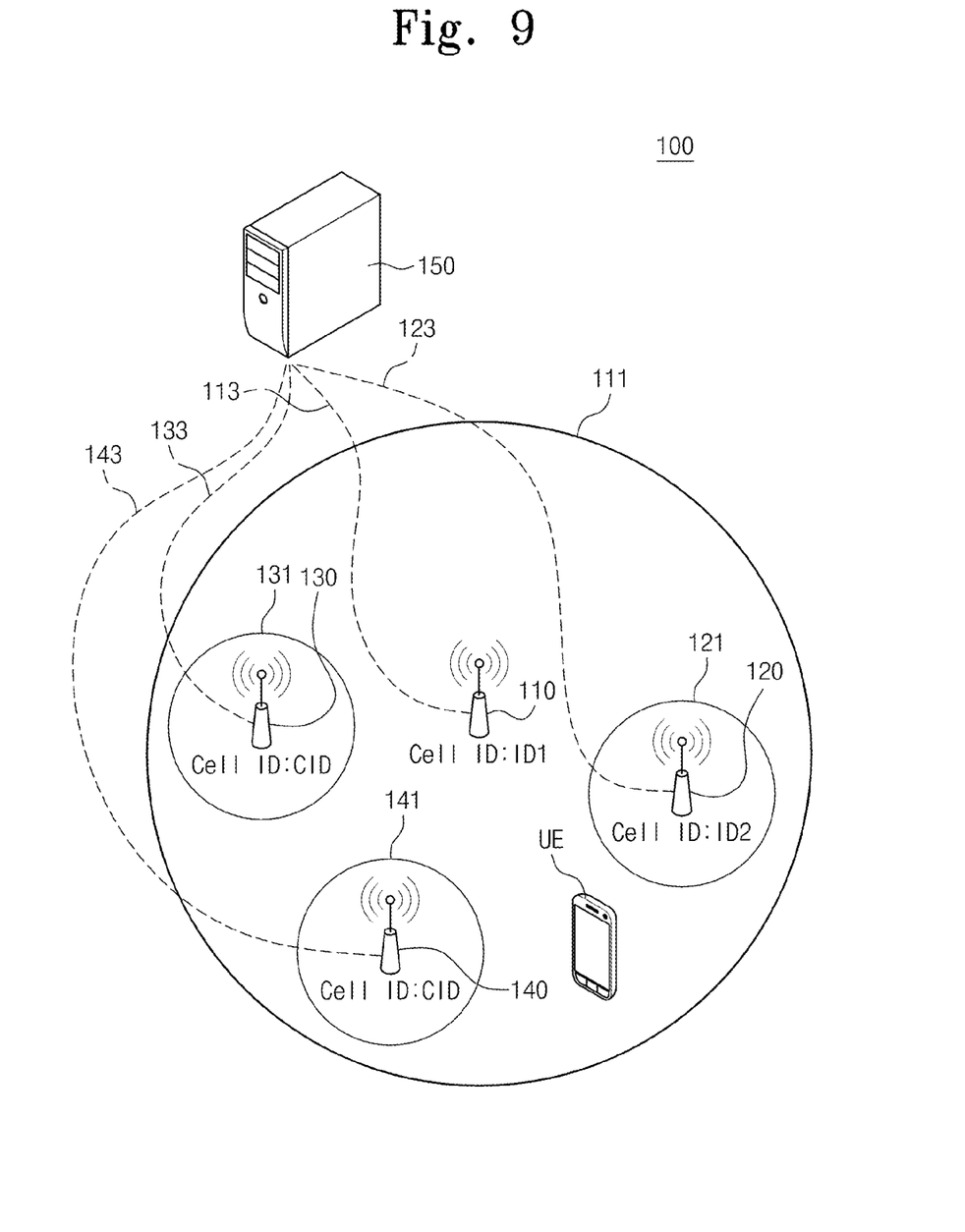
FIG. 9 is a conceptual diagram schematically illustrating an intermediate state of a wireless communication base station.

With the above description, when a servicing terminal exists, the wireless communication base station 100 may be controlled to a merge state or an independent state. However, the inventive concept is not limited thereto. For example, the wireless communication base station 100 may be switched into an intermediate state between a merge state and an independent state. FIG. 9 is a conceptual diagram schematically illustrating an intermediate state of a wireless communication base station. Referring to FIG. 9, radio units 110 and 120 may have different cell identifications ID1 and ID2. Radio units 130 and 140 may have a common cell identification CID that is different from the cell identifications ID1 and ID2 of the radio units 110 and 120. The wireless communication base station 100 may control the radio units 110, 120, 130, and 140 according to a communication environment to be switched into a merge state, an independent state, or an intermediate state.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A wireless communication base station comprising:
a plurality of radio units configured to transmit and receive a radio signal; and
a digital unit connected to the plurality of radio units via cables and configured to operate a communication protocol,
wherein the digital unit controls the plurality of radio units according to a communication environment to be switched into a merge state in which the plurality of radio units forms a cell, or an independent state in which the plurality of radio units forms different cells, respectively,
wherein the digital unit has no function of radio communication,
wherein the digital unit calculates a channel quality based on a channel quality indicator indicating a quality of a downlink channel or information associated with a quality of an uplink channel and controls the plurality of radio units according to the calculated channel quality;
wherein when the plurality of radio units is at the independent state and a channel quality is below a first critical value, the digital unit controls the plurality of radio units to keep the independent state.

2. The wireless communication base station of claim 1, wherein the radio units have different cell coverage, respectively.

3. The wireless communication base station of claim 1, wherein when the plurality of radio units is at the independent state and a spare wireless resource is below a second critical value, the digital unit controls the plurality of radio units to keep the independent state.

4. The wireless communication base station of claim 1, wherein when the plurality of radio units is at the independent state and a spare wireless resource is over a second critical value, the digital unit controls the plurality of radio units to be switched into the merge state.

5. The wireless communication base station of claim 1, wherein when no terminal being serviced exists, the digital unit controls the plurality of radio units to be switched into an idle state.

6. The wireless communication base station of claim 1, wherein when the plurality of radio units is at the merge state and a quality of service is lowered, the digital unit controls the plurality of radio units to be switched into the independent state.

7. The wireless communication base station of claim 1, wherein when the plurality of radio units is at the merge state and a spare wireless resource is over a fourth critical value, the digital unit controls the plurality of radio units to keep the merge state.

8. The wireless communication base station of claim 1, wherein when the plurality of radio units is at the merge state and a spare wireless resource is below a fourth critical value, the digital unit controls the plurality of radio units to be switched into the independent state.

9. The wireless communication base station of claim 1, wherein the digital unit processes baseband signals of the plurality of radio units.

10. The wireless communication base station of claim 1, wherein the plurality of radio units have no functions of processing baseband signals.

11. The wireless communication base station of claim 1, wherein the digital unit controls the plurality of radio units according to channel quality information received from each of the plurality of radio units.

* * * * *